United States Patent [19]

Weidner, Jr.

[11] 4,235,147
[45] Nov. 25, 1980

[54] FASTENER HAVING SEALING HEAD

[75] Inventor: Harry C. Weidner, Jr., Shaker Heights, Ohio

[73] Assignee: The Atlas Bolt & Screw Company, Cleveland, Ohio

[21] Appl. No.: 934,494

[22] Filed: Aug. 16, 1978

[51] Int. Cl.³ .......................................... F16B 23/00
[52] U.S. Cl. ................................. 85/9 R; 85/54
[58] Field of Search ............... 85/1 JP, 54, 9 R, 1 R; 151/38

[56] References Cited

U.S. PATENT DOCUMENTS

| | | | |
|---|---|---|---|
| 3,038,746 | 6/1962 | Molan | 85/54 X |
| 3,134,290 | 5/1964 | Jentoft | 85/9 R |
| 3,168,321 | 2/1965 | Glicksman | 85/1 JP X |
| 3,557,654 | 1/1971 | Weidner | 85/9 R |
| 3,618,444 | 11/1971 | Kay et al. | 85/54 X |
| 3,693,495 | 9/1972 | Wagner | 85/54 X |
| 3,885,492 | 5/1925 | Gutshall | 85/1 JP X |
| 4,041,834 | 8/1977 | Herkes et al. | 85/1 JP X |

*Primary Examiner*—Ramon S. Britts

[57] ABSTRACT

An improved fastener is utilized to provide a sealed connection between two or more members. The fastener includes a threaded metal shank having a head with a relatively large radially extending collar. An end portion of the shank head extends outwardly from the collar. A outer head or covering of polymeric material is molded around the metal shank head. The outer head of polymeric material engages a recess in the metal shank head to hold the polymeric material against rotation when fastener is tightened by applying torque to the polymeric material. The outer head of polymeric material includes a stiff annular skirt which circumscribes the shank of the fastener. The skirt slopes inwardly toward the shank so that when the fastener is tightened, the skirt is pivoted or folded inwardly between the collar and the member to which the fastener is connected. This enables the skirt to provide a weather tight seal between the fastener and the member. This seal is maintained by clamping the skirt between the collar and the member.

10 Claims, 4 Drawing Figures

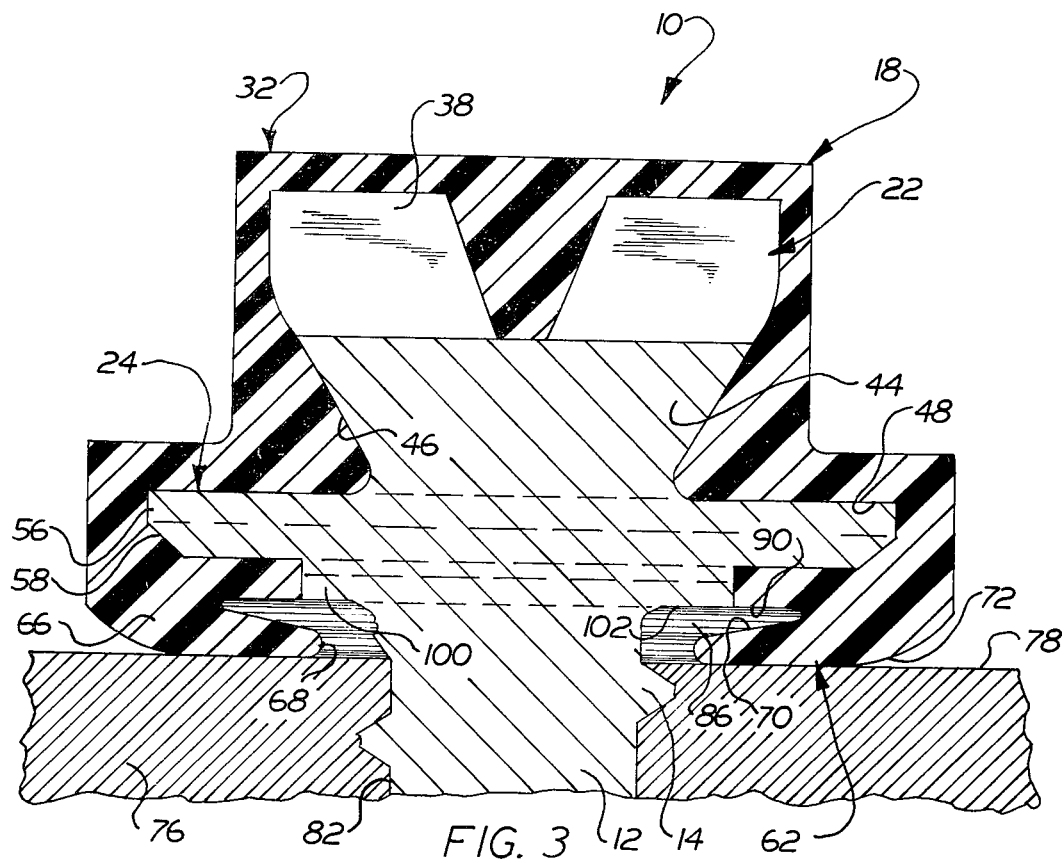
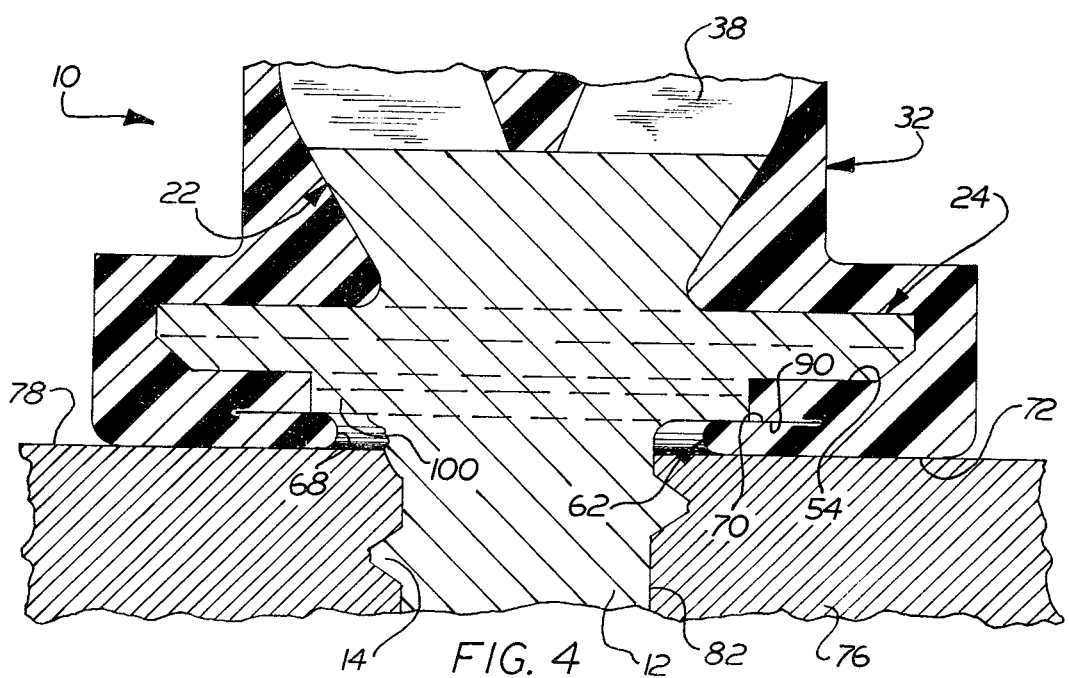

FASTENER HAVING SEALING HEAD

BACKGROUND OF THE INVENTION

The present invention relates to a new and improved fastener which is utilized to interconnect two or more members and to seal the connection between the members.

Relatively light gauge sheet metal panels are commonly connected to building structures to provide a covering which is both aesthetically pleasing and protective of the outside of the building. In order to prevent leakage of water and other substances between the panels and the building, any connections between the panels and the building must be sealed so as to be weather tight. Since the panels have a relatively long service life, for example, 20 years, it is important that a durable seal be provided between the fastener and the panel. Although a fastener constructed in accordance with the present invention can advantageously be utilized to connect sheet metal panels with the outside of a building, it is contemplated that the fastener could be utilized for other purposes, for example to connect light guage sheet metal panels to each other.

In addition to providing a weather tight seal, it is important that a fastener which is used with light gauge sheet metal panels be effective to prevent the panels from being pulled off over the head of the fastener. Since the sheet metal panels are relatively thin, the forces transmitted between the sheet metal and the fastener should be distributed over as large an area as possible to prevent the panel from rupturing or ripping and being pulled off over the head of the fastener.

In addition to the functional requirements that the fastener provide a weather tight seal and distribute forces between the panel and the fastener in such a manner as to prevent pulling off of the panel, it is important that the fastener does not detract from the overall appearance of the outside of the building. To prevent the fastener from detracting from the overall appearance of the outside of the building, the head of the fastener should either match or compliment the color of the panel.

In order to satisfy these diverse requirements, a known fastener has been provided with a plastic outer head or covering in the manner disclosed in U.S. Pat. Nos. 3,134,290 and 3,557,654. Although the fasteners disclosed in these patents are generally satisfactory in connecting panels to the outside of a building, it is believed that the fasteners could be improved to provide a better sealing action and to minimize any possible tendency for pull off of the sheet metal panels over the heads of the fasteners.

In still another effort to provide a fastener to secure a sheet metal plane to the outside of a building, the head of a screw has been provided with a flexible cap of rubber or plastic material which is snapped over the head of the screw in the manner disclosed in U.S. Pat. No. 3,885,492. Since the material of the cap is highly flexible, it is believed that the material of the cap would not be nearly stiff enough to provide a firm seal which would last for the life of the panel. In addition, it is believed that the fastener disclosed in this patent would tend to be susceptible to pull off of the panel since the head of the fastener is provided with a shoulder which engages the panel radially inwardly of the location where the cap seals against the panel. This would tend to concentrate the forces transmitted between the panel and the head of the screw.

SUMMARY OF THE PRESENT INVENTION

The present invention provides a new and improved fastener which is used to interconnect two or more members and to seal the connection between the members. In addition, the fastener is effective to transmit force to the members over a relatively large area to thereby tend to minimize pull off of a member over the head of the fastener when the member is a relatively thin gauge sheet metal panel. In order to obtain these advantages, the fastener has a metal head which is enclosed by a polymeric or plastic outer head. This outer head has a relatively stiff skirt which slopes radially inward toward the shank of the fastener in such a manner as to be positively deflected inwardly when the fastener is tightened into place.

To provide a long lasting weather tight seal between the head of the fastener and the member to which it is connected, the skirt is clamped against the member by a radially outwardly projecting collar formed on a shank head of the fastener. This results in a relatively large area of engagement between the skirt and the members so that forces are transmitted between the fastener and the member over a relatively large area to prevent the member from being pulled over the head of the fastener.

In addition, the skirt is formed of a relatively stiff material which is not readily deflected. Therefore, substantial clamping forces are required in order to deflect the skirt radially inwardly toward the head of the fastener. This results in a firm weather tight seal between the head of the fastener and the member. The relatively stiff polymeric material of the skirt of the fastener provides a long lasting seal which will not leak with passage of time even thought the seal is exposed to extremely inclement weather conditions.

Accordingly, it is an object of this invention is to provide a new and improved fastener which provides a sealed connection between a plurality of members and wherein the fastener has a skirt which deflects inwardly toward the shank of the fastener and is clamped between a metal collar on the head of the fastener and a member to provide tight seal when the fastener is connected with the member.

BRIEF DESCRIPTION OF THE DRAWINGS

The foregoing and other objects and features of the present invention will become more apparent upon a consideration of the following description taken in connection with the accompanying drawings wherein:

FIG. 3 is a fragmentary sectional view, similar to FIG. 2, illustrating the relationship between the skirt on the head of the fastener and a panel member with which the fastener is connected when the fastener is partially tightened; and FIG. 4 is a fragmentary sectional view, similar to FIG. 3, of the fastener in a fully tightened condition.

DESCRIPTION OF ONE SPECIFIC PREFERRED EMBODIMENT OF THE INVENTION

Figure 1:
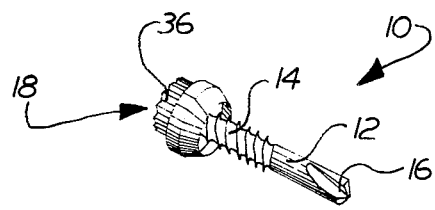
FIG. 1 is a pictorial illustration of a fastener constructed in accordance with the present invention.

An improved fastener constructed in accordance with the present invention includes a generally cylindrical metal shank 12 on which an external thread convolution 14 is formed. The metal shank 12 is provided with a self-drilling end portion 16 which forms a hole in a member when the fastener is rotated at a relatively high speed. The thread convolution 14 on the shank 12 of the fastener 10 is of the self-tapping type and is effective to form an internal thread in a member in which a hole has been drilled by the leading end portion 16 of the shank. Although the fastener 10 is advantageously provided with a self-drilling leading end portion 16 and a self-tapping thread 14, other types of leading end portions and/or threads could be utilized if desired.

The fastener 10 has a head assembly 18 which is effective to provide an improved weather tight seal between the fastener and a member by which it is connected. In addition, the head assembly 18 is effective to retard pulling of a relatively light gauge sheet metal member over the head of the fastener under the influence of forces transmitted between the sheet metal and the head. The head assembly 18 has color which matches or compliments the color of a member with which the fastener is utilized.

The trailing or outer end portion of the metal shank 12 of the fastener 10 is provided with a metal shank head 22 (see FIG. 2) which forms part of the head assembly 18. The metal shank head 22 is integrally formed with the shank 12 and includes a circular collar 24 which extends radially outwardly of the shank 12. The shank head 22 also includes a metal head portion 28 which is integrally formed with and extends axially outwardly from the collar 24 in a direction away from the metal shank 12 of the fastener. The head portion 28 has a generally circular configuration and is disposed in a coaxial relationship with the collar 24 and the shank 12.

The metal shank head 22 is enclosed by a polymeric outer head or layer 32 which is molded in place over the metal shank head 22. The outer head 32 is provided with a circular array of axially extending recesses or knurls 36 (see FIG. 1) which are engaged by suitable socket to rotate the fastener 10. In order to prevent relative rotation between the polymeric material of the outer head 32 (FIG. 2) and the metal shank head 22 upon the application of torque to the outer head, the metal shank head is provided with a pair of generally V-shaped slots 38 and 40 which extend diametrically across the circular head portion 28 and intersect at right angles in the center of the head portion. The slots 38 and 40 provide a recess into which the polymeric material of the outer head 32 flows when the outer head is molded in place over the metal shank head 22.

In order to prevent axial movement between the polymeric material of the outer head 32 and the metal shank head 22, the shank head has a radially and axially outwardly flairing portion 44 which forms an annular recess extending radially into the shank head 22. Thus, the shank head 22 has a frustroconical, outer side surface 46. This side surface is engaged by the polymeric material of the outer head 32 to trap the polymeric material in the annular recess between the head portion 28 and the collar 24 of the shank head 22.

In order to promote the transmittal of forces over a relatively large area between the head assembly 18 and a member which is held in place by the fastener 10, the circular metal collar 24 extends radially outwardly of both the head portion 28 and the shank 12 of the fastener. The metal collar 24 has an annular upper side surface 48 which faces toward the head portion 28 and extends perpendicular to a longitudinal central axis 50 of the shank 12. An annular lower surface 54 of the collar 24 faces toward the shank 12 and extends parallel to the upper surface 48. The lower surface 54 is connected with the upper surface by a cylindrical edge surface 56 and a generally conical edge surface 58.

In accordance with a feature of the present invention, the outer head 32 of the fastener is provided with an annular skirt 62 which circumscribes the shank 12 at a location beneath the collar 24. The skirt 62 has an annular base portion 66 and an annular outer end portion 68 which are interconnected by a sloping inner side surface 70 and a sloping outer side surface 72. In order to maximize the radial extent of the skirt 62, the annular base portion 66 has an outside diameter which is greater than the diameter of the collar 24 and is coextensive with the maximum diameter of the outer head 32. This enables the skirt 62 to tend to minimize any tendency for a light gauge sheet metal member to pull over the head of the fastener.

The two side surfaces 70 and 72 of the skirt 62 slope inwardly. Therefore when axially upwardly directed forces are applied against the annular end portion 68 of the skirt 62, the skirt is folded or pivoted radially inwardly toward the shank 12 and toward the collar 24. Thus, when the fastener 10 is connected with a light guage sheet metal panel member 76 in the manner shown in FIGS. 3 and 4, the skirt 62 is clamped between an outer surface 78 of the panel 76 and the collar 24. This causes the outer side surface 72 of the skirt 62 to sealingly engage a relatively large annular area of the panel surface 78 to prevent the leakage of water and other substances from outside of the head assembly 18 into a hole 82 in the panel 76.

Since the annular skirt 62 is clamped between the circular collar 24 and the outer side surface 78 and panel 76 and is formed of a relatively stiff and durable polymeric material, a firm long lasting seal is provided between the fastener and the outer surface of the panel 76. In one specific instance, the outer head 32 was formed of nylon which is extremely durable in inclement weather conditions and has a rockwell hardness number of R-118, M79. This relatively stiff durable material results in the skirt 62 pressing firmly against the outer side surface 78 of the panel 76 to provide a tight long lasting seal between the head of the fastener and the panel. The metal collar 24 maintains a firm clamping action against the skirt 62 to further promote the longevity of the seal.

The fastener 10 has an annular recess 86 (FIGS. 2 and 3) formed between the inner surface 70 of the skirt 62 and a flat annular side surface 90 of the polymeric material in the outer head 32. The size of the recess 86 is decreased as the fastener 10 is tightened against the sheet metal member 76. In fact, it is contemplated that the fastener 10 will be turned into the panel 76 to an extent such that the inner side surface 70 of the skirt 62 abuts the flat annular surface 90 in a manner shown in FIG. 4.

It should be noted that a firm tight seal is provided between the head of the fastener 10 and the panel 78 even when the fastener is not tightly connected with the panel in the manner shown in FIG. 4. Thus, when the fastener 10 is in the partially tightened condition of FIG. 3, the skirt 62 is clamped against the panel 76 by the collar 24. At this time, the outer side surface 72 of the skirt 62 sealingly engages the panel 72. Therefore a weather tight seal is provided even if the fastener is not fully tightened or if the fastener should tend to work loose with the passage of time.

However, when the fastener 10 is tightly connected with the panel in the manner shown in FIG. 4, a somewhat larger seal area is provided. This larger seal area results in the distribution of forces between the panel 76 and the head of the fastener 10 over a relatively large area to prevent pulling off of the panel over the head of the fastener.

If the fastener is accidentally connected with the panel 76 with a longitudinal central axis 50 of the fastener skewed somewhat so that the axis 50 does not extend perpendicularly to the outer side surface 78 of the panel, a tight seal is still formed completely around the head of the fastener. This is because a portion of the skirt 62 on one side of the head of the fastener 10 will be clamped in a manner shown in FIG. 4. Due to the skewed orientation of the fastener 10, the collar 24 will be slightly canted or tilted relative to the surface 78 of the panel. Therefore a diametrically opposite side of the skirt 62 will be clamped against the panel 76 in the manner shown in FIG. 3. Even though this portion of the skirt is not fully compressed as shown in FIG. 4, a tight seal is provided completely around the skirt to prevent leakage of water and/or other material into the hole 82 in the panel 76.

In one specific instance, a fastener constructed in accordance with the present invention was turned into a hole formed in a panel with a torque of 40 inch pounds. A central axis of the fastener was skewed at an angle of 10° from a line extending perpendicular to the outer side surface of the panel. Even though the fastener was skewed so that one side of the annular skirt 62 was compressed to a greater extent than the opposite side of the skirt, a weather tight seal was provided completely around the head of the fastener. This was true even though a relatively light torque of 40 inch pounds was applied to the head of the fastener. It is contemplated that in normal use a torque of from 60 to 100 inch pounds will be applied to the fasteners 10.

When a torque of 50 inch pounds was applied to a fastener constructed in accordance with the present invention and skewed at an angle of 10° to a line extending perpendicular to the surface of the panel, the clamping forces between the collar 24 and the outer side surface 78 of the panel were sufficient to fully compress the annular skirt 62 throughout its entire extent in a manner similar to that shown in FIG. 4. Of course, one side of the skirt was compressed to a somewhat greater extent that the diametrically opposite side of the skirt due to the skewed orientation of the fastener.

Figure 2:
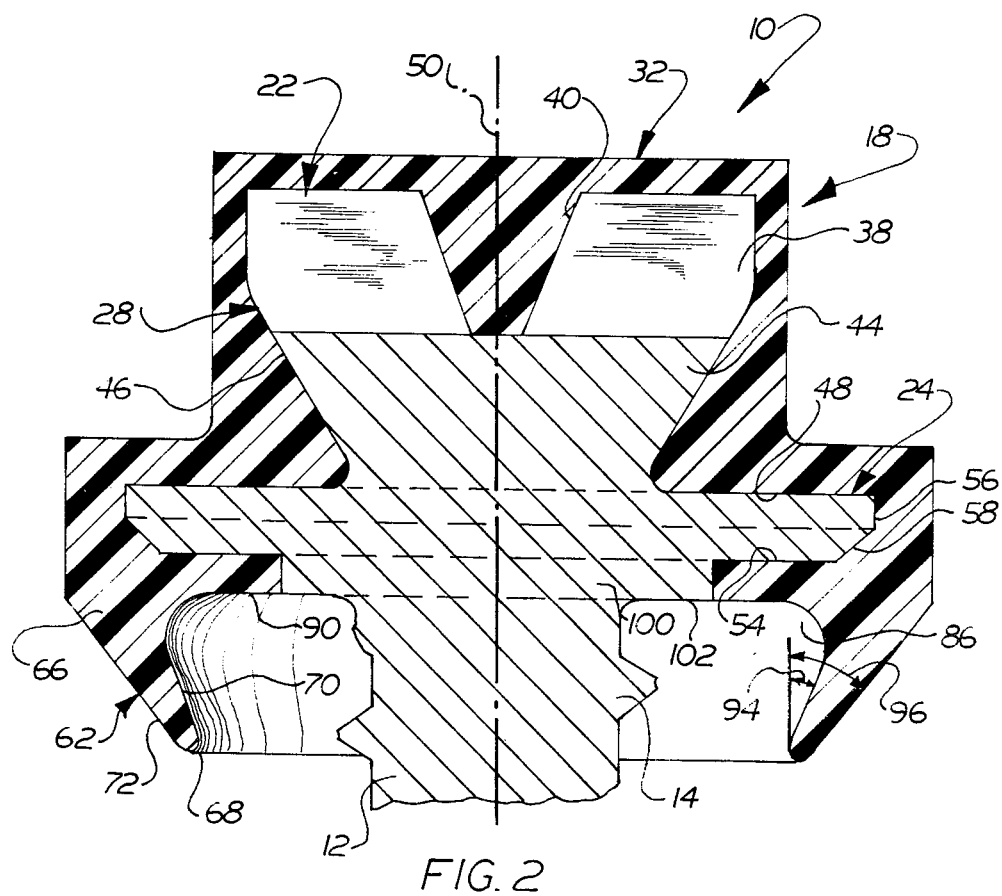
FIG. 2 is an enlarge fragmentary sectional view of the head of the fastener of FIG. 1.

Whenever the fastener 10 is connected with a panel, the skirt 62 is pivoted or folded radially and axially inwardly from the position shown in FIG. 2, through the position shown in FIG. 3 to the position shown in FIG. 4. In order to provide for this inward folding of the skirt 62, the skirt is formed so that it initially tapers radially inwardly toward the shank 12 in the manner shown in FIG. 2. Thus, the annular inner side surface 70 of the skirt 62 extends at a relatively small acute angle 94 to the longitudinal central axis 50 of the shank 12. The annular outer side surface 72 of the skirt extends at a somewhat larger angle 96 relative to the longitudinal central axis 50 of the shank 12. In one specific embodiment of the invention, the angle 94 was 20° and the angle 96 was 38°. Of course, the angles 94 and 96 could be varied as long as the skirt tended to taper inwardly toward the shank 12 of the fastener in the manner shown in FIG. 2.

To facilitate forming the fastener 10, a cylindrical metal spacer 100 (see FIG. 2) advantageously provided between the upper end of the shank 12 and the collar 24. The cylindrical spacer 100 has a diameter which is less than the diameter of the collar 24 and greater than the diameter of the shank 12. The spacer 12 is integrally formed with the collar 24 and shank 12 and has an annular side surface 102 which extends around the shank 12 and is coplanar with the flat annular surface 90 on the outer head 32 of the fastener. When the fastener is being formed, the surface 102 (FIG. 2) is placed in abutting engagement with a reference surface in a die. Molten thermal setting plastic material of a suitable color is then poured into the die cavity and flows into the space between the bottom surface 54 of the collar 24 and the die surface engaged by the side surface 102 of the cylindrical spacer 100 thereby limiting the axial extent of this portion of the outer head 32.

In view of the foregoing, it is apparent that the present invention provides a new and improved fastener 10 which is used to interconnect two or more members and to seal the connection between the members. In addition, the fastener 10 is effective to transmit force to the members over a relatively large area to thereby tend to minimize pull off of a member over the head of the fastener when the member is a relatively thin guage sheet metal panel 76. In order to obtain these advantages, the fastener 10 has a metal shank head 22 which is enclosed by a polymeric or plastic outer head 32. This outer head 32 has a relatively stiff skirt 62 which slopes radially inward toward the shank 12 of the fastener 10 in such a manner as to be positively deflected inwardly when the fastener is tightened into place. The polymeric material of the outer head 32 is colored to match or compliment the color of the panel 76.

To provide a long lasting weather tight seal between the head 18 of the fastener 10 and the member 76 to which it is connected, the skirt 62 is clamped against the member by a radially outwardly projecting collar 24 formed on a shank head 22 of the fastener. This results in a relatively large area of engagement between the skirt 62 and the member so that forces are transmitted between the fastener 10 and the member 76 over a relatively large area to prevent the member from being pulled over the head of the fastener.

In addition, the skirt 62 is formed of a relatively stiff material which is not readily deflected. Therefore, substantial clamping forces are required in order to deflect the skirt 62 radially inwardly toward the head of the fastener. This results in a firm weather tight seal between the head 18 of the fastener 10 and the member 76. The relatively stiff polymeric material of the skirt 62 of the fastener 10 provides a long lasting seal which will not leak with passage of time even though the seal is exposed to extremely inclement weather conditions.

Having described one specific preferred embodiment of the invention, the following is claimed:

1. A fastener for providing a sealed connection between a plurality of members, said fastener comprising a longitudinally extending metal shank, a thread convolution formed on the shank for engaging at least one of the plurality of members, a metal shank head connected to one end portion of said shank and integrally formed with said shank, said shank head including a circular collar disposed in a coaxial relationship with said shank and a head end portion projecting outwardly from said collar in a direction away from said shank and disposed in a coaxial relationship with said collar, said collar extending radially outwardly from said shank for a greater distance than said head end portion and having a first annular side surface area facing toward said shank, a second annular side surface area facing toward said head end portion and a third side surface area interconnecting said first and second side surface areas, said metal shank head further including a cylindrical section disposed between said collar and said shank, said cylindrical section having a cylindrical side surface with a diameter which is less than the diameter of said collar and greater than the diameter of said shank, said head end portion including surface means for defining at least one recess in said head end portion, and an outer head of polymeric material molded over and at least partially enclosing said metal shank head, said outer head of polymeric material including a first portion at least partially enclosing said head end portion and engaging said recess in said head end portion to retard relative movement between said outer head of polymeric material and said head end portion upon application of forces to said outer head tending to rotate said fastener about the longitudinal central axis of said shank, said outer head of polymeric material including a second portion covering said first, second and third surface areas of said collar, said second portion including an annular section of polymeric material having a first annular side surface abutting said first surface area of said collar and a second annular side surface facing toward said shank, said annular section of polymeric material being disposed in abutting engagement with said cylindrical side surface of said cylindrical section throughout the circumferential extent of said cylindrical side surface, said annular section of polymeric material having a thickness between said first and second sides which is equal to the axial extent of said cylindrical section, said outer head of polymeric material further including a circular skirt projecting outwardly from said second side of said annular section in a direction toward said shank, said skirt sloping axially and radially toward said shank from an annular base portion integrally formed with said annular section of said outer head to an annular edge portion which circumscribes said shank and is spaced apart from said shank, said annular base portion having an inside diameter which is substantially smaller than the outside diameter of said collar and an outside diameter which is greater than the outside diameter of said collar, said annular edge portion having an inside diameter which is less than the inside diameter of said base portion and which is less than the outside diameter of said collar, said skirt having an annular inner surface which slopes inwardly from said base toward said shank to said annular edge portion at a first angle to the longitudinal central axis of said shank and which cooperates with said second side of said annular section of said outer head to at least partially define an annular cavity which circumscribes said shank and has a greater radial extent adjacent to the base portion of said skirt than adjacent to said edge portion of said skirt, said skirt having an annular outer side surface which slopes inwardly from said base portion toward said shank to said annular edge portion at a second angle to the longitudinal central axis of said shank, said skirt being deflectable inwardly toward said shank and said collar under the influence of forces applied against said skirt by one of the members upon connection of the fastener with the members, said skirt being clamped between said collar and the one member to decrease the volume of said annular cavity and to enable said outer side surface of said skirt to be pressed into tight sealing engagement with the outer surface of the one member.

2. A fastener as set forth in claim 1 wherein said annular edge portion of said skirt circumscribes said shank at a location radially outwardly from said thread convolution prior to connection of said fastener with the members.

3. A fastener as set forth in claim 1 wherein said head end portion flares outwardly in a direction away from said shank from a first section adjacent to said collar to a second section which is spaced apart from said collar to provide a recess for receiving the polymeric material of said first portion of said outer head to hold said first portion of said outer head against axial movement relative to said shank.

4. A fastener as set forth in claim 1 wherein said first and second side surfaces of said annular section are flat side surfaces which extend parallel to each other.

5. A fastener for providing a sealed connection between a plurality of members, said fastener comprising a longitudinally extending metal shank, a thread convolution formed on the shank for engaging at least one of the plurality of members, a metal shank head connected to one end portion of said shank and integrally formed with said shank, said shank head including a circular collar disposed in a coaxial relationship with said shank and a head end portion projecting outwardly from said collar in a direction away from said shank and disposed in a coaxial relationship with said collar, said collar extending radially outwardly from said shank for a greater distance than said head end portion and having a first annular side surface area facing toward said shank, a second annular side surface area facing toward said head end portion and a third side surface area interconnecting said first and second side surface areas, said head end portion including surface means for defining at least one recess in said head end portion, said metal shank head further including a cylindrical section disposed between said collar and said shank, said cylindrical section having a diameter which is less than the diameter of said collar and greater than the diameter of said shank, and an outer head of polymeric material molded over and at least partially enclosing said metal shank head, said outer head of polymeric material including a first portion at least partially enclosing said head end portion and engaging said recess in said head end portion to retard relative movement between said outer head of polymeric material and said head end portion upon application of forces to said outer head tending to rotate said fastener about the longitudinal central axis of said shank, said outer head of polymeric material including a second portion covering said first, second and third surface areas of said collar, said second portion including an annular section of polymeric material having a first side abutting said first surface area of said collar and a second side facing toward said shank, said annular section of polymeric material circumscribing said cylindrical section of said shank head, said outer head of polymeric material further including a circular skirt extending from said second portion of said outer head in a direction toward said shank, said skirt sloping axially and radially toward said shank from an annular base portion integrally formed with said annular section of said outer head to an annular edge portion which circumscribes said shank and is spaced apart from said shank, said annular edge portion having an inside diameter which is less than the inside diameter of said base portion and which is less than the outside diameter of said collar, said skirt having an annular inner surface which slopes inwardly from said base portion toward said shank to said annular edge portion at a first angle to the longitudinal central axis of said shank, said skirt having an annular outer side surface which slopes inwardly from said base portion toward said shank to said annular edge portion at a second angle to the longitudinal central axis of said shank, the dimension of said skirt from its base portion to its edge portion being greater than the dimension thereof from said base portion to said cylindrical section of said shank head, said skirt being deflectable inwardly toward said shank and said collar from an unrestrained position to a sealing position under the influence of forces applied against said skirt by one of the members upon connection of the fastener with the members, said inner side surface of said skirt being disposed in engagement with said cylindrical section of said metal shank head and with said second side of said annular section of polymeric material when said skirt is in the sealing position, said outer side surface of said skirt being disposed in engagement with the outer side surface of the one member when said skirt is in the sealing position.

6. A fastener as set forth in claim 5 wherein said annular edge portion of said skirt circumscribes said shank at a location radially outwardly from said thread convolution prior to connection of said fastener with the members.

7. A fastener as set forth in claim 5 wherein said base portion of said skirt has an inside diameter which is smaller than the diameter of said collar and an outside diameter which is greater than the diameter of said collar, said base portion of said skirt being disposed radially outwardly of said cylindrical section of said metal shank head.

8. A fastener as set forth in claim 5 wherein said head end portion flares outwardly in a direction away from said shank from a first section adjacent to said collar to a second section which is spaced apart from said collar to provide a recess for receiving the polymeric material of said first portion of said outer head to hold said first portion of said outer head against axial movement relative to said shank.

9. A fastener for providing a sealed connection between a plurality of members, said fastener comprising a longitudinally extending metal shank, a thread convolution formed on the shank for engaging at least one of the plurality of members, a metal shank head connected to one end portion of said shank and integrally formed with said shank, said shank head including a circular collar disposed in a coaxial relationship with said shank and a head end portion which flares outwardly from said collar in a direction away from said shank and disposed in a coaxial relationship with said collar, said head end portion having an axially outer end which is larger than an axially inner end which is disposed adjacent to said collar to provide a radially outwardly facing recess between said collar and the axially outer end of said head end portion, said collar extending radially outwardly from said shank for a greater distance than said head end portion and having a first annular side surface area facing toward said shank, a second annular side surface area facing toward said head end portion and a third side surface area interconnecting said first and second side surface areas, said head end portion including surface means for defining at least one axially outwardly opening recess in said head end portion, said metal shank head further including a cylindrical section disposed between said collar and said shank in a coaxial relationship with said collar and said shank, said cylindrical section having a flat circular side surface which faces toward said shank and has a diameter which is less than the diameter of said collar and is greater than the diameter of said shank, and an outer head of polymeric material molded over and at least partially enclosing said metal shank head, said outer head of polymeric material including a first portion at least partially enclosing said head end portion and engaging said axially outwardly opening recess in said head end portion to retard relative movement between said outer head of polymeric material and said head end portion upon application of forces to said outer head tending to rotate said fastener about the longitudinal central axis of said shank, said outer head of polymeric material engaging said radially outwardly opening recess to hold said outer head of polymeric material against axial movement relative to said shank, said outer head of polymeric material including a second portion covering said first, second and third surface areas of said collar, said second portion including an annular section of polymeric material having a first side abutting said first surface area of said collar and a second side facing toward said shank, said annular section of polymeric material circumscribing said cylindrical section of said shank head with said second side of said annular section of polymeric material disposed in a coplanar relationship with said flat circular side surface of said cylindrical section, said outer head of polymeric material further including a circular skirt extending from said second portion of said outer head in a direction toward said shank, said skirt sloping axially and radially toward said shank from an annular base portion integrally formed with said annular section of said outer head to an annular edge portion which circumscribes said shank and is spaced apart from said shank, said annular base portion of said skirt having an inside diameter which is smaller than the outside diameter of said collar and an outside diameter which is greater than the outside diameter of said collar, said annular edge portion having an inside diameter which is less than the inside diameter of said base portion and which is less than the outside diameter of said collar, said skirt having an annular inner surface which slopes inwardly from said base toward said shank to said annular edge portion at a first angle to the longitudinal central axis of said shank and which cooperates with said second side of said annular section of said outer head to at least partially define an annular cavity which circumscribes said shank and has a greater radial extent adjacent to the base portion of said skirt than adjacent to said edge portion of said skirt, said skirt having an annular outer side surface which slopes inwardly from said base portion toward said shank to said annular edge portion at a second angle to the longitudinal central axis of said shank, the dimension of said skirt from its base portion to its edge portion being greater than the dimension thereof from said base portion to said cylindrical section of said shank head, said skirt being deflectable inwardly toward said shank and said collar from an unrestrained position to a sealing position under the influence of forces applied against said skirt by one of the members upon connection of the fastener with the members, said skirt being clamped between said collar and the one member to decrease the volume of said annular cavity and to enable said outer side surface of said skirt to be pressed against the outer surface of the one member upon deflection of said skirt from the unrestrained position to the sealing position, said inner side surface of said skirt being disposed in engagement with said cylindrical section of said metal shank head and with said second side of said annular section of polymeric material when said skirt is in the sealing position, said outer side surface of said skirt being disposed in engagement with the outer side surface of the one member when said skirt is in the sealing position.

10. A fastener as set forth in claim 9 wherein said first angle between the longitudinal central axis of said shank and said inner side surface of said skirt is approximately 20° and said second angle between the longitudinal central axis of said shank and said outer side surface of said skirt is approximately 38°.

* * * * *